(12) United States Patent
Higashi

(10) Patent No.: US 11,023,136 B2
(45) Date of Patent: Jun. 1, 2021

(54) STORAGE DEVICE AND CONTROL METHOD

(71) Applicant: Toshiba Memory Corporation, Tokyo (JP)

(72) Inventor: Hirotaka Higashi, Kawasaki Kanagawa (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 159 days.

(21) Appl. No.: 16/289,339

(22) Filed: Feb. 28, 2019

(65) Prior Publication Data
US 2020/0089413 A1   Mar. 19, 2020

(30) Foreign Application Priority Data
Sep. 19, 2018 (JP) .............................. JP2018-174672

(51) Int. Cl.
*G06F 3/06* (2006.01)

(52) U.S. Cl.
CPC .......... *G06F 3/0611* (2013.01); *G06F 3/0656* (2013.01); *G06F 3/0659* (2013.01); *G06F 3/0679* (2013.01)

(58) Field of Classification Search
CPC .... G06F 3/0611; G06F 3/0679; G06F 3/0659; G06F 3/0656
See application file for complete search history.

(56) References Cited

U.S. PATENT DOCUMENTS

| 8,134,876 B2 | 3/2012 | Choi et al. |
| 8,760,946 B2* | 6/2014 | Dearth ................ G06F 13/4243 365/193 |
| 9,021,154 B2 | 4/2015 | Morris et al. |
| 9,401,197 B2 | 7/2016 | Jeon |
| 9,811,273 B1* | 11/2017 | Brahmadathan ...... G06F 3/0619 |
| 10,095,263 B1* | 10/2018 | Wu ......................... G06F 3/061 |
| 2013/0003475 A1* | 1/2013 | Jenkins ................. G06F 3/0659 365/193 |
| 2014/0237162 A1 | 8/2014 | Brewer et al. |
| 2018/0267724 A1* | 9/2018 | Jang ....................... G06F 3/0659 |
| 2019/0354431 A1* | 11/2019 | Lee ....................... G06F 3/0679 |

FOREIGN PATENT DOCUMENTS

| JP | 2010-146252 A | 7/2010 |
| JP | 2013-196574 A | 9/2013 |
| JP | 2014-157603 A | 8/2014 |

* cited by examiner

Primary Examiner — Masud K Khan
(74) *Attorney, Agent, or Firm* — Kim & Stewart LLP

(57) ABSTRACT

A storage device includes a non-volatile memory including a buffer of a first size and a controller. The controller is configured to transmit a control command to the non-volatile memory, and then repeat a process including a first process of changing a phase value of a timing signal indicating timing to read or write data from or to the non-volatile memory and a second process of reading or writing data having a second size smaller than the first size from or to the non-volatile memory in synchronization with the timing signal of the changed phase value, a certain plurality of times without transmitting any other control command to the non-volatile memory during repetition of the process.

20 Claims, 13 Drawing Sheets

STORAGE DEVICE AND CONTROL METHOD

CROSS-REFERENCE TO RELATED APPLICATION

This application is based upon and claims the benefit of priority from Japanese Patent Application No. 2018-174672, filed on Sep. 19, 2018, the entire contents of which are incorporated herein by reference.

FIELD

Embodiments described herein relate generally to a storage device and a control method.

BACKGROUND

In a storage device such as a solid state drive (SSD), for example, an access such as reading or writing of data is performed with respect to a memory device from a memory access circuit via various signal lines. The memory access circuit has a structure that adjusts a delay amount of signals so that communication of reading data or writing data can be reliably carried out between the memory access circuit and the memory device. The adjustment of the delay amount performed by the structure may be referred to as training.

DETAILED DESCRIPTION

Figure 1:
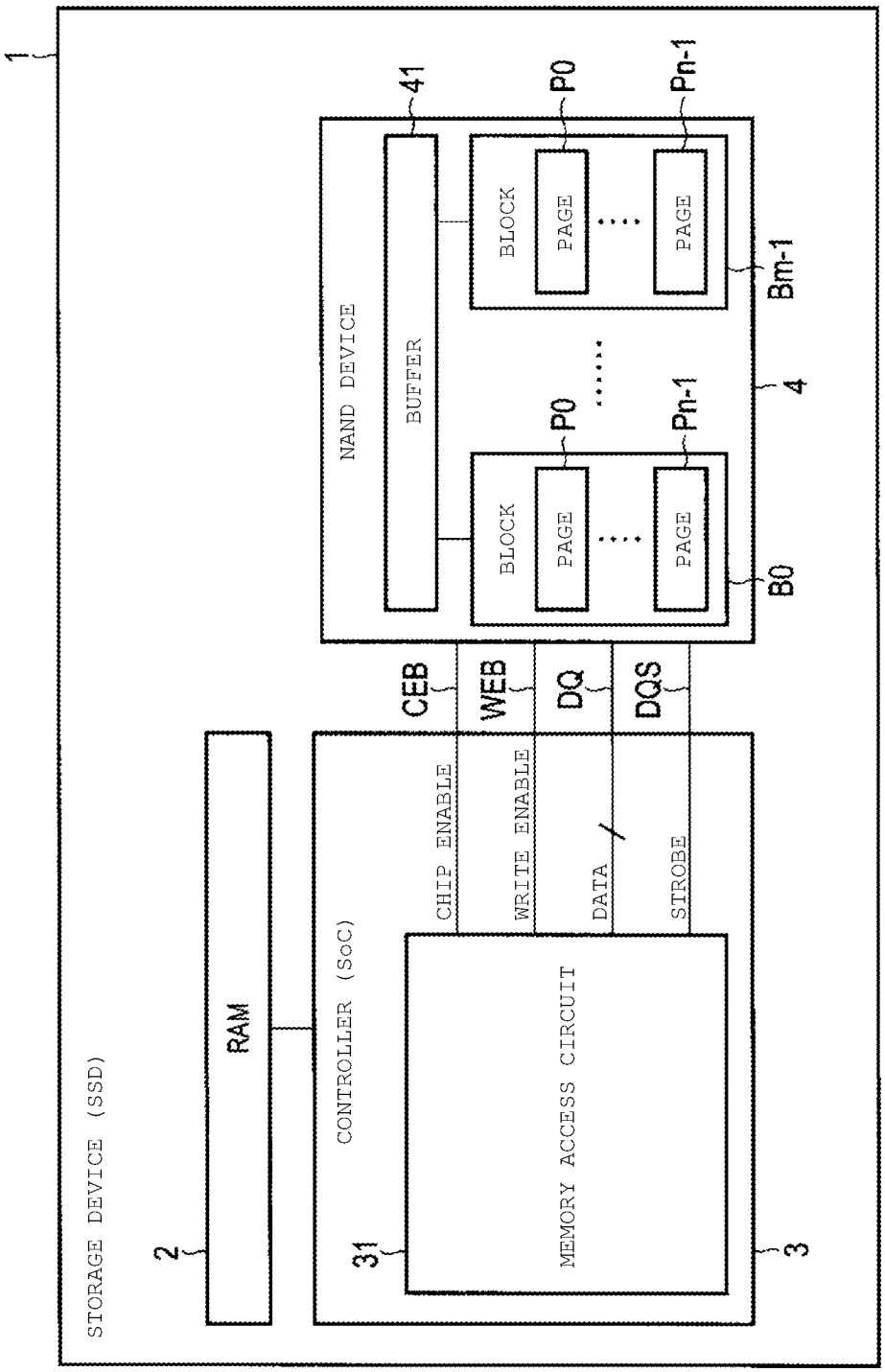
FIG. 1 is a block diagram showing an example of a configuration of a storage device according to an embodiment.

Embodiments provide a storage device and a control method capable of shortening a time required to access a memory device.

In general, according to an embodiment, a storage device includes a non-volatile memory including a buffer of a first size and a controller. The controller is configured to transmit a control command to the non-volatile memory, and then repeat a process including a phase changing process of changing a phase value of a timing signal indicating timing to read data from the non-volatile memory and a read process of reading data having a second size smaller than the first size from the non-volatile memory to the buffer in synchronization with the timing signal of the changed phase value, a certain plurality of times without transmitting any other control command to the non-volatile memory during repetition of the process.

According to another embodiment, a storage device includes a non-volatile memory including a buffer of a first size and a controller. The controller is configured to transmit a control command to the non-volatile memory, and then repeat a process including a phase changing process of changing a phase value of a timing signal indicating timing to write data from the non-volatile memory and a write process of writing data having a second size smaller than the first size from the non-volatile memory to the buffer in synchronization with the timing signal of the changed phase value, a certain plurality of times without transmitting any other control command to the non-volatile memory during repetition of the process.

In a delay adjustment circuit of the related art, delay adjustment of signals is performed using adjustment values of a plurality of delay amounts for the signals. When the adjustment value is determined, a read access or a write access from a memory access circuit to a memory device is repeatedly performed. Then, an adjustment value corresponding to the optimum delay amount capable of more correctly reading or writing the data is calculated. Hereinafter, calculation of the adjustment value is referred to as training.

In the training, a parallel type memory access circuit having a data bus of a plurality of bit widths individually repeats a read access or a write access to the NAND device, and acquires distributions of a delay amount for which reading or writing of data is passed and a delay amount for which reading or writing of data is failed for each bit of the data bus.

In the related art, when the memory access circuit accesses the NAND device, a command phase takes time, so the time during which data is not read or written is relatively long. This is one of the reasons that a random access performance to the NAND device is low.

Hereinafter, the embodiment will be described with reference to the drawings. In the following description, substantially or essentially the same functions and components are denoted by the same reference numerals, and descriptions thereof will be made as necessary.

FIG. 1 is a block diagram showing an example of a configuration of a storage device 1 according to the embodiment.

The storage device 1 is a storage device such as a solid state drive (SSD), for example. The storage device 1 includes a random access memory (RAM) 2, a controller 3, a NAND device 4, and the like. The RAM 2 and the NAND device are electrically connected to the controller 3. A plurality of the NAND devices 4 are electrically connected to the controller 3.

The RAM 2 is used as a work area of the controller 3. The RAM 2 may be used, for example, as cache memory for temporarily storing data. The RAM 2 is volatile memory such as static random access memory (SRAM) or dynamic random access memory (DRAM). The RAM 2 may be built in the controller 3.

The controller 3 is, for example, an integrated circuit (IC) for controlling operation of the entire storage device 1, and all or a part of which are configured with, for example, a system on chip (SoC), an application specific integrated circuit (ASIC), and a field-programmable gate array (FPGA). The controller 3 includes a memory access circuit 31.

The memory access circuit 31 performs a memory access such as a read access and a write access to the NAND device 4.

The memory access circuit 31 and the NAND device 4 are connected by an address bus designating an address for the memory access, a data bus for communicating read data or write data, a control bus for communicating control signals, and the like. In the following description, the description of the address bus will be omitted.

The signal transmitted on the control bus includes, for example, a chip enable signal CEB designating a chip in the NAND device 4 selected as an access target, a write enable signal WEB indicating the command and address fetch timing, a strobe signal (also referred to as a clock signal) DQS indicating the timing of acquiring data with respect to a parallel data signal DQ of a plurality of bits, and the like.

Each of the above signals may be represented by another name. For example, the chip enable signal CEB may be a signal represented by another name, which has a similar function, such as a chip select signal or a device select signal.

The signal transmitted on the data bus includes, for example, a data signal DQ including write data or read data. Although the bit width of the data bus is not limited in the embodiment, the following description shows, for convenience, that the data bus has a plurality of bit widths.

The data signal DQ and the strobe signal DQS are signals that can be bidirectionally communicated. Signals other than those described above may be transmitted or received using the data bus and the control bus. Details of the memory access circuit 31 will be described below with reference to FIG. 2.

In addition to the memory access circuit 31, the controller 3 may include, for example, an interface (I/F) with a host device connectable to the storage device 1, a central processing unit (CPU) that executes control of the storage device 1, a controller of the RAM 2, and the like. Further, the controller 3 may include a storage area such as a ROM or another RAM.

The NAND device 4 is non-volatile memory configuring a storage area of the storage device 1. The NAND device 4 is, for example, a NAND flash memory, but may be other non-volatile semiconductor memory such as NOR flash memory, magnetoresistive random access memory (MRAM: magnetoresistive memory), phase change random access memory (PRAM: phase change memory), resistive random access memory (ReRAM: resistance change type memory), ferroelectric random access memory (FeRAM), or magnetic memory. For example, the NAND device 4 may be memory having a planar arrangement structure of storage elements, or memory having a three-dimensional arrangement structure of storage elements.

The NAND device 4 includes at least one NAND flash memory chip (a plurality of NAND flash memory dies).

Each chip includes a memory cell array. The memory cell array includes a plurality of NAND blocks (blocks) B0 to Bm−1 (m is an integer of 1 or more). The blocks B0 to Bm−1 function as data erase units. The block may also be referred to as a "physical block" or an "erase block".

The blocks B0 to Bm−1 include a plurality of pages (physical pages). That is, each of the blocks B0 to Bm−1 includes pages P0 to Pn−1 (n is an integer of 2 or more). In the non-volatile memory, reading of data and writing of data are executed in page units, and erasing of data is executed in block units.

The NAND device 4 includes a buffer 41. The buffer 41 is a storage area for temporarily storing write data received from the memory access circuit 31 or read data read from the respective blocks B0 to Bm−1. The NAND device 4 includes volatile memory like the RAM 2 as the buffer 41, for example. A capacity of the buffer 41 corresponds to a page size, for example, about 16 Kbytes.

In the embodiment, when training a bus corresponding to one bit of the data bus, the memory access circuit 31 executes the write access or the read access to the NAND device 4 by changing a delay amount a plurality of times. Assuming that the capacity (size) of data to be read or written each time the delay amount is changed once is, for example, 1 Kbyte, the buffer 41 can store approximately 16 training data sets. That is, when the training of the delay adjustment circuit is executed, the buffer 41 can store a plurality of training data sets.

Figure 2:
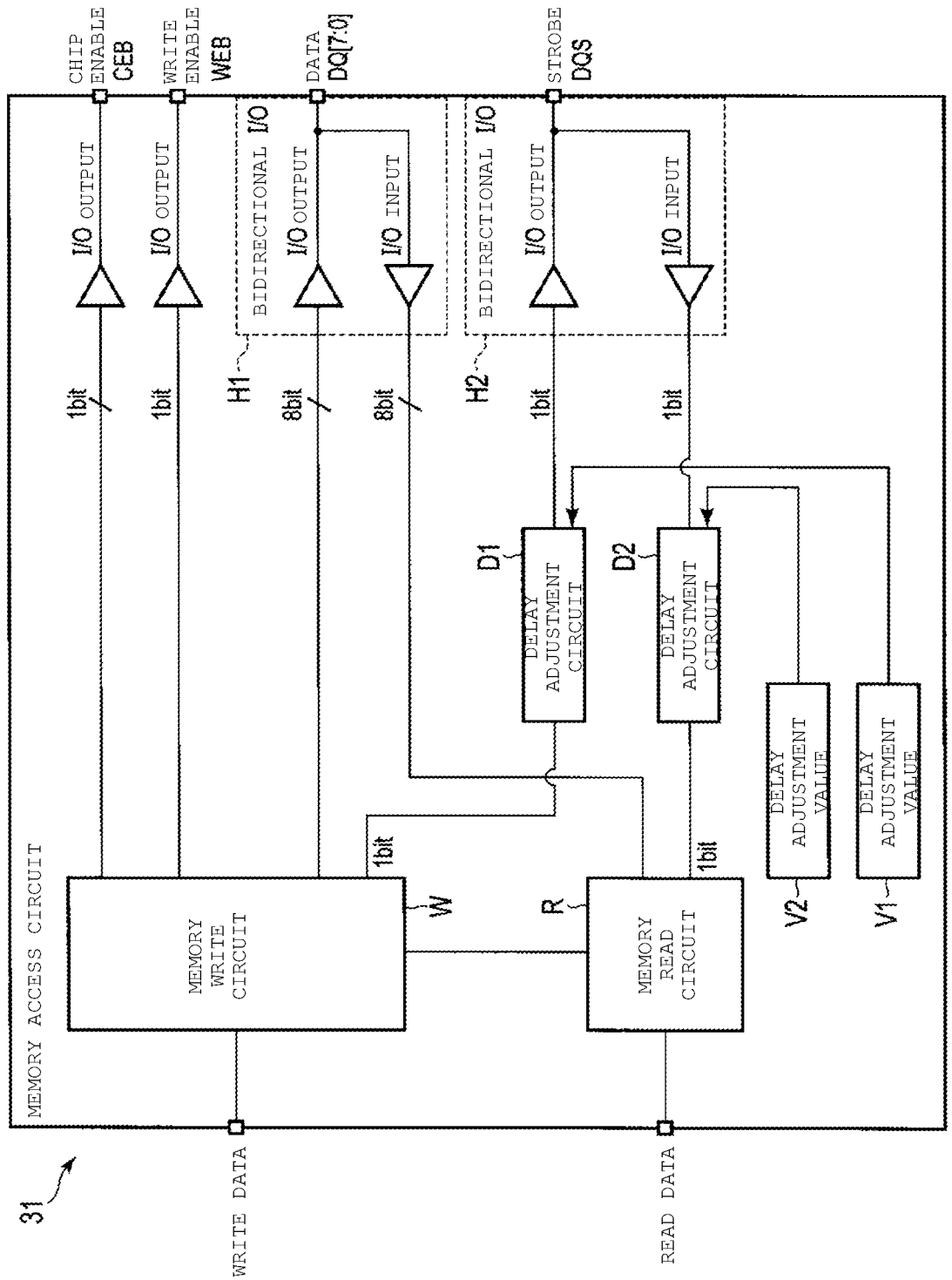
FIG. 2 is a block diagram showing an example of a configuration of a memory access circuit of the storage device according to the embodiment.

FIG. 2 is a block diagram showing an example of a configuration of the memory access circuit 31 of the storage device 1 according to the embodiment.

The memory access circuit 31 includes a memory write circuit W, a memory read circuit R, delay adjustment circuits D1 and D2, circuits for storing bidirectional I/Os H1 and H2 and delay adjustment values V1 and V2, and the like.

The bidirectional I/Os H1 and H2 are, for example, circuits for switching a communication direction of signal according to whether a memory access to the NAND device 4 is either a write access or a read access.

Hereinafter, how the memory access circuit 31 operates when data is written from the memory access circuit 31 to the NAND device 4 will be described.

The controller 3 receives a write command, a logical address of a write destination, write data, and the like from, for example, the host device or the like connected to the storage device 1.

The controller 3 converts the logical address of the write destination into a physical address. The physical address is output from the memory access circuit 31 to the NAND device 4 via the address bus.

The write data is output to the NAND device 4 as the data signal DQ via the memory write circuit W and the bidirectional I/O H1. In the embodiment, it is assumed that the data signal DQ is, for example, an 8-bit parallel signal (DQ0 to DQ7).

The memory write circuit W generates a write strobe signal. The write strobe signal is delay-adjusted by the delay adjustment circuit D1. The delay-adjusted write strobe signal is output to the NAND device 4 as the strobe signal DQS via the bidirectional I/O H2.

In addition, the memory write circuit W generates the write enable signal WEB and the chip enable signal CEB indicating the NAND device 4 as an access target. The generated write enable signal WEB and the generated chip enable signal CEB are output to the NAND device 4.

In the embodiment, it is assumed that the number of the NAND devices 4 connected to the memory access circuit 31 is one, and the chip enable signal CEB is a 1-bit signal. However, the plurality of NAND devices 4 may be connected to the memory access circuit 31, and accordingly, the chip enable signal may be a signal of a plurality of bits.

Hereinafter, how the memory access circuit 31 operates when data is read from the NAND device 4 to the memory access circuit 31 will be described.

The controller 3 receives a read command, a logical address of a read destination, and the like from, for example, the host device or the like connected to the storage device 1.

The controller 3 converts the logical address of the read destination into a physical address. The physical address is output from the memory access circuit 31 to the NAND device 4 via the address bus.

The memory read circuit R generates a chip enable signal CEB indicating the NAND device 4 of the read destination and outputs the chip enable signal CEB to the NAND device 4 via the memory write circuit W.

The NAND device 4 transmits the read data based on the address to the memory access circuit 31. The read data is input to the memory access circuit 31 as the data signal DQ and is transmitted to the host device or the like connected to, for example, the storage device 1 via the bidirectional I/O H1 and the memory read circuit R.

In addition, the memory read circuit R outputs a read enable (REB) signal (not shown) to the NAND device 4. The read enable signal is used as a signal (clock signal) indicating transmission of a read transfer period and the timing of acquiring the read data.

When the read enable signal is received, the NAND device 4 outputs a read strobe signal together with the read data to the memory access circuit 31. The read strobe signal is input to the memory access circuit 31 (as the strobe signal DQS), and delay-adjusted by the delay adjustment circuit D2 via the bidirectional I/O H2. The delay-adjusted read strobe signal is input to the memory read circuit R.

In the training, the memory read circuit R compares the data read from the NAND device 4 with the data (expected values) written in the NAND device 4. Based on the comparison result, the memory access circuit 31 determines whether or not the written data is correctly read.

The delay adjustment circuits D1 and D2 adjust the timing of signals based on the delay adjustment values V1 and V2, respectively. The delay adjustment circuit D1 is a delay adjustment circuit for transmission and the delay adjustment circuit D2 is a delay adjustment circuit for reception.

The delay adjustment values V1 and V2 may be held in the memory access circuit 31 or may be stored in the storage area inside the controller 3 but outside the memory access circuit 31.

In the embodiment, a configuration in which the delay adjustment circuits D1 and D2 are connected with respect to the strobe signal DQS output or input from the memory access circuit 31 will be described. However, delay adjustment may be performed by connecting a delay adjustment circuit having the similar configuration also with respect to other signals (such as the chip enable signal CEB, the write enable signal WEB, and the data signal DQ).

Figure 3:
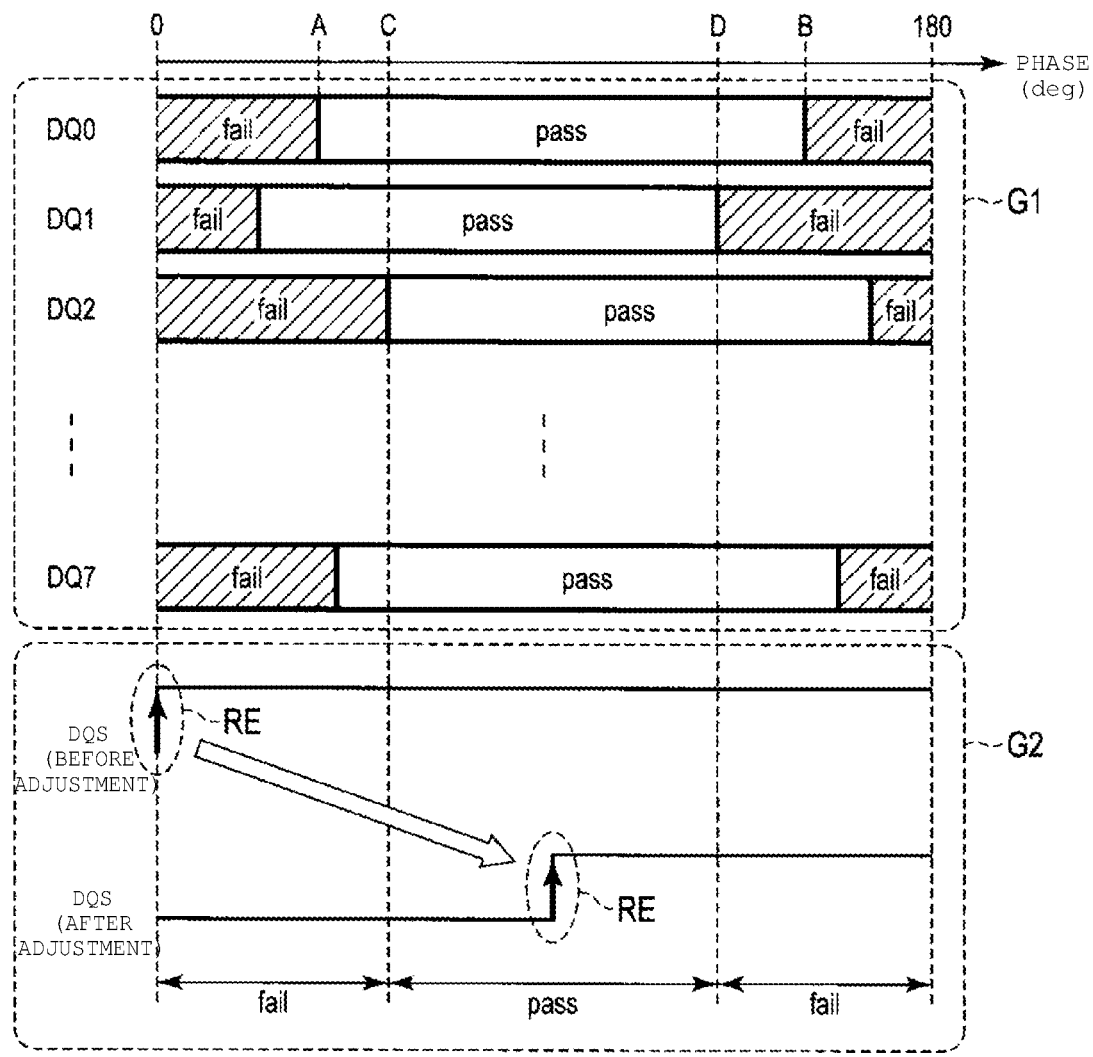
FIG. 3 is a diagram illustrating a relationship between data signals and a strobe signal in the storage device according to the embodiment.

FIG. 3 is a diagram illustrating a relationship between the data signal DQ and the strobe signal DQS in the storage device 1 according to the embodiment.

As described above, when the read access or the write access is performed to the NAND device 4, the data of the data signal DQ is acquired at the timing based on the strobe signal DQS (for example, rising edge or falling edge of the strobe signal DQS).

However, when the timing of acquiring the data generated based on the strobe signal DQS and the timing at which the data is stably present in the data signal DQ are shifted, acquisition of the data may fail. Therefore, by the above-described training, an adjustment value indicating the optimum delay amount (phase) of the strobe signal DQS is calculated, and the strobe signal is delay-adjusted by the adjustment value.

In the training, the delay amount of the strobe signal DQS is changed by a predetermined value, whether or not acquisition of data signals DQ0 to DQ7 is passed is determined, and a value which is a boundary of the pass or fail is obtained.

A graph G1 is a graph illustrating distributions of whether or not data can be correctly acquired according to a change in the delay amount of the strobe signal DQS for each of the data signals DQ0 to DQ7 (hereinafter referred to as a "pass/fail distribution"). A horizontal axis of the graph G1 indicates the delay amount (phase: unit [deg]) of the strobe signal DQS.

For example, with respect to the data signal DQ0, the horizontal axis of the graph G1 indicates that when the phase of the strobe signal DQS is delayed by an amount in arrange from 0 to A [deg], acquisition of the data signal DQ0 fails, when the phase of the strobe signal DQS is delayed by an amount in a range from A to B [deg], the acquisition of the data signal DQ0 is passed, and when the delay amount is further increased and the phase of the strobe signal DQS is delayed by an amount of B [deg] or more, the acquisition of the data signal DQ0 fails.

By the above procedure, similar distributions are obtained for the other data signals DQ1 to DQ7.

A graph G2 is a graph showing the optimum delay amount of the strobe signal DQS. In the graph G2, it is assumed that a rising edge RE occurs in the range of 0 to 180 [deg], and a falling edge FE occurs in the range of 180 to 360 [deg] (not shown). Further, the falling edge FE may occur in the range of 0 to 180 [deg], and the rising edge RE may occur in the range of 180 to 360 [deg] (not shown). For example, when acquiring the data signal DQ at both the rising edge RE and the falling edge FE of the strobe signal DQS, it is preferable that the delay amount of the strobe signal DQS is adjusted so that all the data signals DQ0 to DQ7 can be acquired at both the edges. In the example of the distributions of the data signals DQ0 to DQ7 shown in the graph G1, it can be seen that the delay amount of the strobe signal DQS for which the acquisition of all the data signals DQ0 to DQ7 is passed is from C to D [deg]. Therefore, in the range of the graph G2, the delay amount of the strobe signal DQS is adjusted so that the delay amount of the rising edge RE falls within the range of C to D [deg]. The delay amount of the rising edge RE is preferably at the substantially center of C to D [deg].

As described above, in order to obtain the adjustment value of the strobe signal DQS, it is necessary to repeatedly perform the read access or the write access to the NAND device 4 to obtain the pass/fail distributions of all the data signals DQ0 to DQ7. Therefore, the shorter the time required for the read access or the write access, the more efficient training can be performed.

In the following description, a process of generating a pass/fail distribution in the range of 0 to 180 [deg] and calculating a delay adjustment value will be described. The process described below can be similarly applied to the case where the delay adjustment value is calculated in the range of 180 to 360 [deg].

Figure 4:
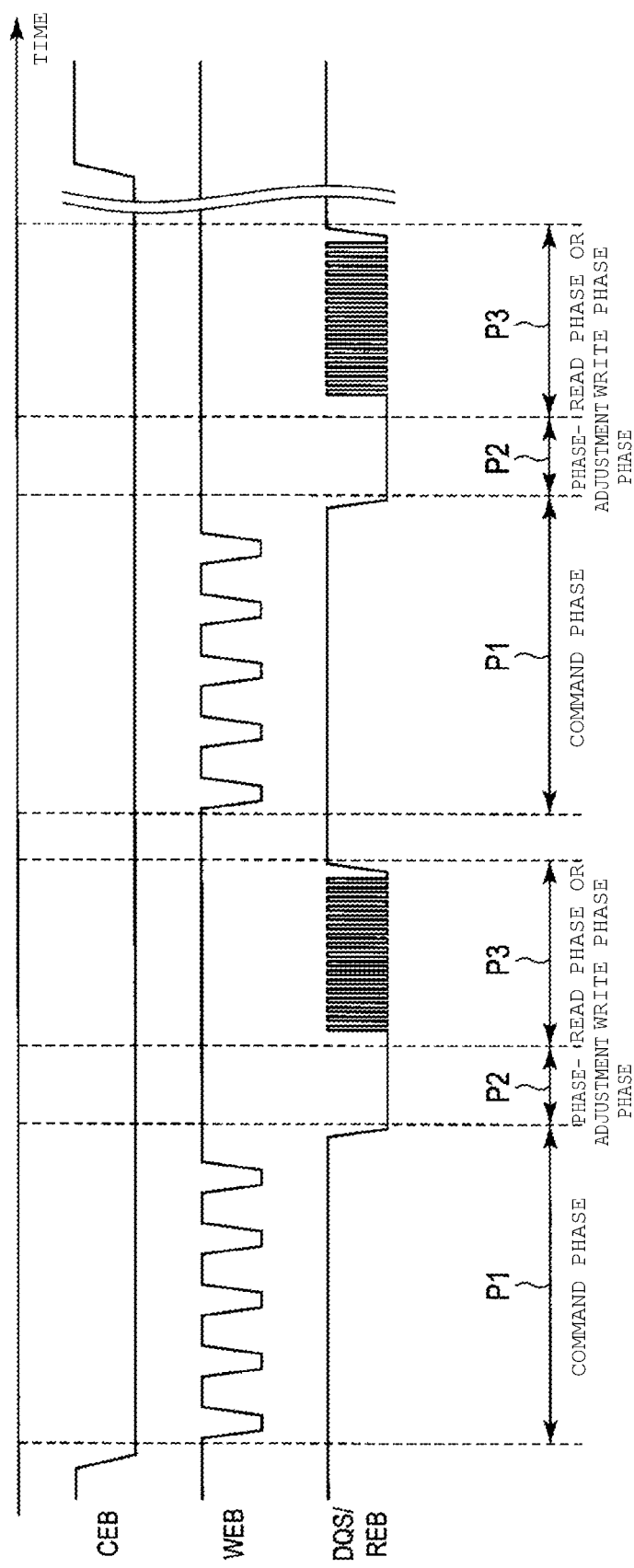
FIG. 4 is a timing chart showing an example of a memory access during a training process carried out in a storage device according to a comparative example.

FIG. 4 is a timing chart showing an example of a memory access in training of a storage device according to a comparative example. In FIG. 4, a timing chart of signals in a data bus and an address bus is omitted.

First, a memory access circuit provided in the storage device sets a chip enable signal CEB to an active state (L level) in order to start an access to a NAND device. Then, the memory access circuit starts a command phase P1 to the NAND device. The command phase P1 includes transmission of a control command such as a read command or a write command, and transmission of an address of an access destination (that is, a read destination or a write destination), and the like. For example, according to the rise of the write enable signal WEB, the command and the address are fetched into the NAND device.

After the command phase P1 is completed, the memory access circuit starts a phase-adjustment phase P2. In the phase-adjustment phase P2, the memory access circuit changes the phase of the strobe signal DQS by a predetermined amount, for example.

Thereafter, the memory access circuit starts a read (or write) phase P3 for the NAND device. In the read (or write) phase P3, communication of read data (or write data) is performed between the memory access circuit and the NAND device.

In the training according to the comparative example, as described above, the command phase P1, the phase-adjustment phase P2, and the read (or write) phase P3 are repeated in this order. Specifically, each time the phase of the strobe signal DQS is gradually changed, the transmission of the command and the reading (or writing) of the data signal DQ are repeatedly executed and the pass or fail is determined, whereby the pass/fail distribution is obtained.

Figure 5:
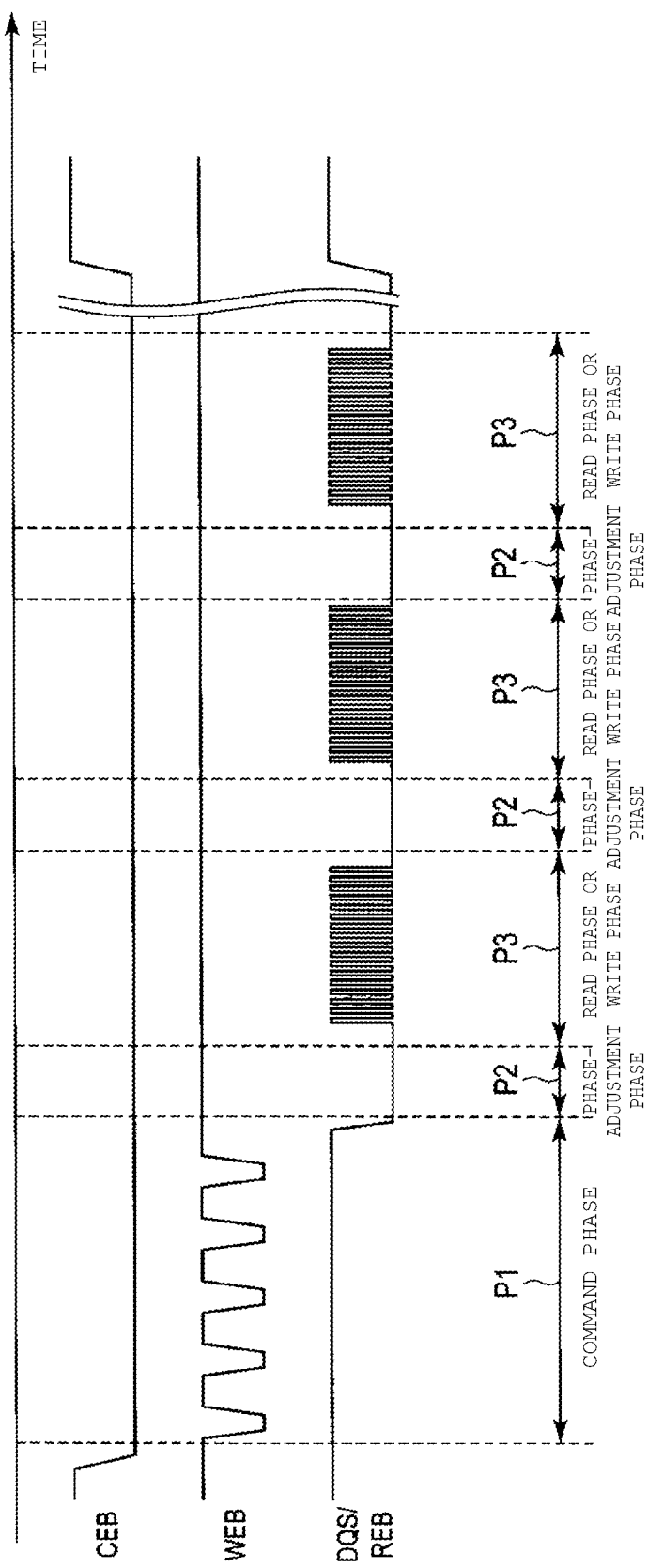
FIG. 5 is a timing chart showing an example of a memory access during a training process carried out in the storage device according to the embodiment.

FIG. 5 is a timing chart showing an example of a memory access in training of the storage device 1 according to the embodiment. In FIG. 5, in a similar manner as in FIG. 4, a timing chart of signals in the data bus and the address bus is omitted.

In the training, for example, the same data is written to the same address of each NAND device 4 and the same data is read from the same address of each NAND device 4 in order to clarify characteristic differences between the NAND devices 4. That is, in the read access and the write access in the training, a set value in the command phase P1 for each NAND device 4 and data in the read (or write) phase P3 are the same.

Therefore, the command phase P1 for the phase-adjustment phase P2 and the read (or write) phase P3 can be shared in the training for one NAND device 4. In other words, it is possible to execute the phase-adjustment phase P2 and the read (or write) phase P3 a plurality of times after executing the command phase P1 once for one NAND device 4.

In addition, the pieces of data to be read (or written) by the read (or write) phase P3 a plurality of times are each stored in a predetermined address of the buffer 41, so that a plurality of times of consecutive reading (or writing) operations can be achieved.

In consideration of the above, in the embodiment, after the command phase P1, the phase-adjustment phase P2, and the read (or write) phase P3 are completed, the memory access circuit 31 further repeats the phase-adjustment phase P2 and the read (or write) phase P3 at least one or more times. In other words, after the command phase P1 is executed, the memory access circuit 31 repeats changing the phase of the strobe signal DQS each time a predetermined number of data is read (or written). In the phase-adjustment phase P2, the memory access circuit 31 changes the phase of the strobe signal DQS by a predetermined amount every time.

Accordingly, the data signal DQ can be read (or written) consecutively a plurality of times while changing the delay amount (phase) of the strobe signal DQS in one command phase P1, so that the training time can be shortened.

It is preferable that the number of data read (or written) in one read (or write) phase P3 is predetermined as one unit of training.

Further, the number of times of repetition of the phase-adjustment phase P2 and the read (or write) phase P3 is flexibly determined by the relationship between the data amount of the data signal DQ to be read (or written) at one time and the capacity of the buffer 41 for storing the data, training algorithms, or the like.

Figure 6:
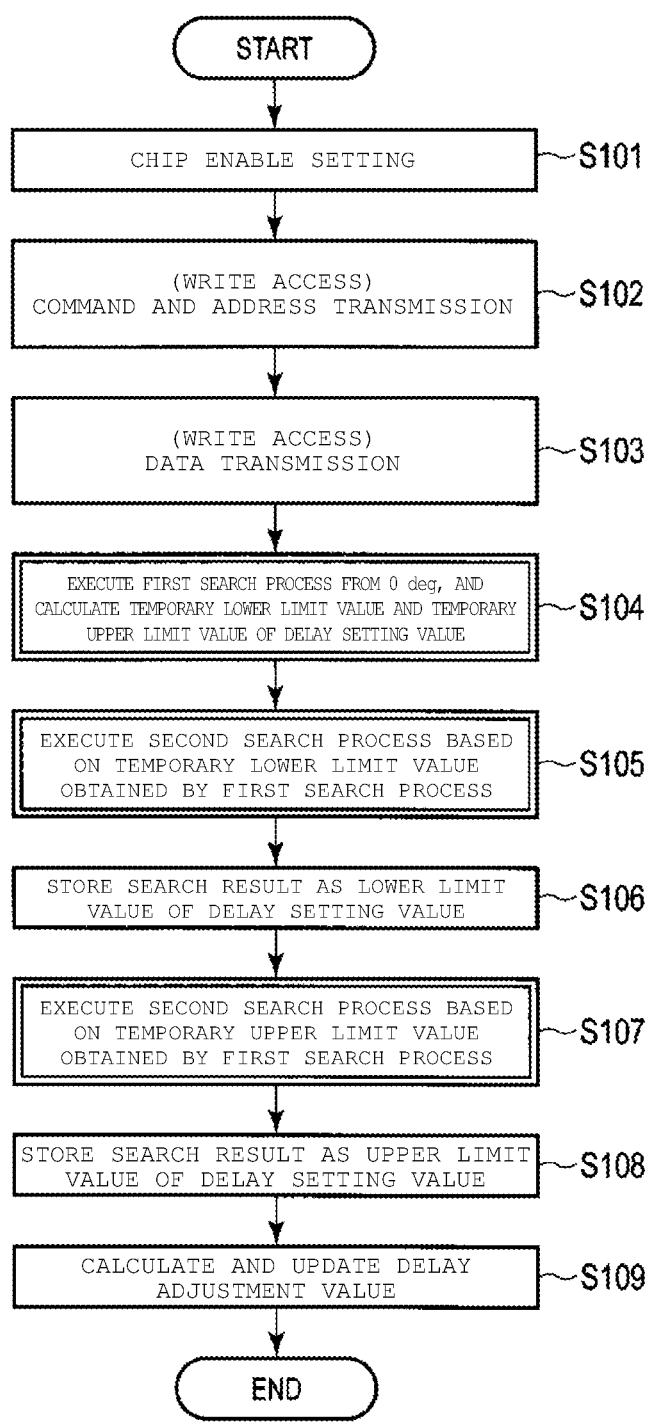
FIG. 6 is a flowchart showing an example of a read training process in the embodiment.

FIG. 6 is a flowchart showing an example of a read training process according to the embodiment.

In S101, the memory access circuit 31 sets the chip enable signal CEB of the NAND device 4 that is a process target to an active state.

In S102, the memory access circuit 31 transmits a write command to the NAND device 4.

In S103, the memory access circuit 31 transmits write data to the NAND device 4.

By the processes of S102 and S103, the data that the memory access circuit 31 reads from the NAND device 4 in the read training is written to the NAND device 4.

In processes after S104, the memory access circuit 31 reads the data already written in the NAND device 4 in the processes until S103 while changing the delay amount of the strobe signal DQS. Accordingly, the pass/fail distribution in the read access and an approximate boundary value of the pass and fail are calculated.

In S104, the memory access circuit 31 sets an initial set value of the delay amount of the strobe signal DQS to 0 [deg], and executes a first search process of reading the write data consecutively a plurality of times while adjusting by roughly increasing the set value to 180 [deg]. An adjustment width (increasing width in this case) of the set value is determined by, for example, the number of times of read processes executed consecutively a plurality of times. For example, when the read process is executed consecutively 16 times, the adjustment width of the set value is 180/16=11.25 [deg].

As a result of the first search process, the memory access circuit 31 calculates a temporary lower limit value and a temporary upper limit value of a delay setting value. Details of the first search process will be described below with reference to FIG. 7.

Here, the lower limit value of the delay setting value is a set value near a lower end of a pass area in the pass/fail distribution, which is a value not including a set value that is failed. Similarly, the upper limit value of the delay setting value is a set value near an upper end of the pass area, which is a value not including a set value that is failed.

In S105, the memory access circuit 31 sets an initial value of the delay amount of the strobe signal DQS to a value near the temporary lower limit value obtained by the first search process. Then, the memory access circuit 31 executes a second search process of reading the write data consecutively a plurality of times while increasing the set value with an adjustment width (increasing width in this case) finer than the adjustment width of the set value in the first search process.

In S106, the memory access circuit 31 stores the search result obtained by the second search process based on the temporary lower limit value as a lower limit value of the delay setting value.

In S107, the memory access circuit 31 sets the initial value of the delay amount of the strobe signal DQS to a value near the temporary upper limit value obtained by the first search process. Then, similarly to S105, the memory access circuit 31 executes the second search process of reading the write data consecutively a plurality of times while decreasing the set value with an adjustment width (decreasing width in this case) finer than the adjustment width of the set value in the first search process.

Details of the second search process based on the temporary lower limit value in S105 and the second search process based on the temporary upper limit value in S107 will be described below with reference to FIG. 8.

In S108, the memory access circuit 31 stores the search result obtained by the second search process based on the temporary upper limit value as an upper limit value of the delay setting value.

In S109, the memory access circuit 31 calculates and updates the delay adjustment value V2 of the delay adjustment circuit D2 on the memory read circuit R side based on the upper limit value and the lower limit value of the delay setting values obtained by S106 and S108. By the above procedure, the read training is completed.

Figure 7:
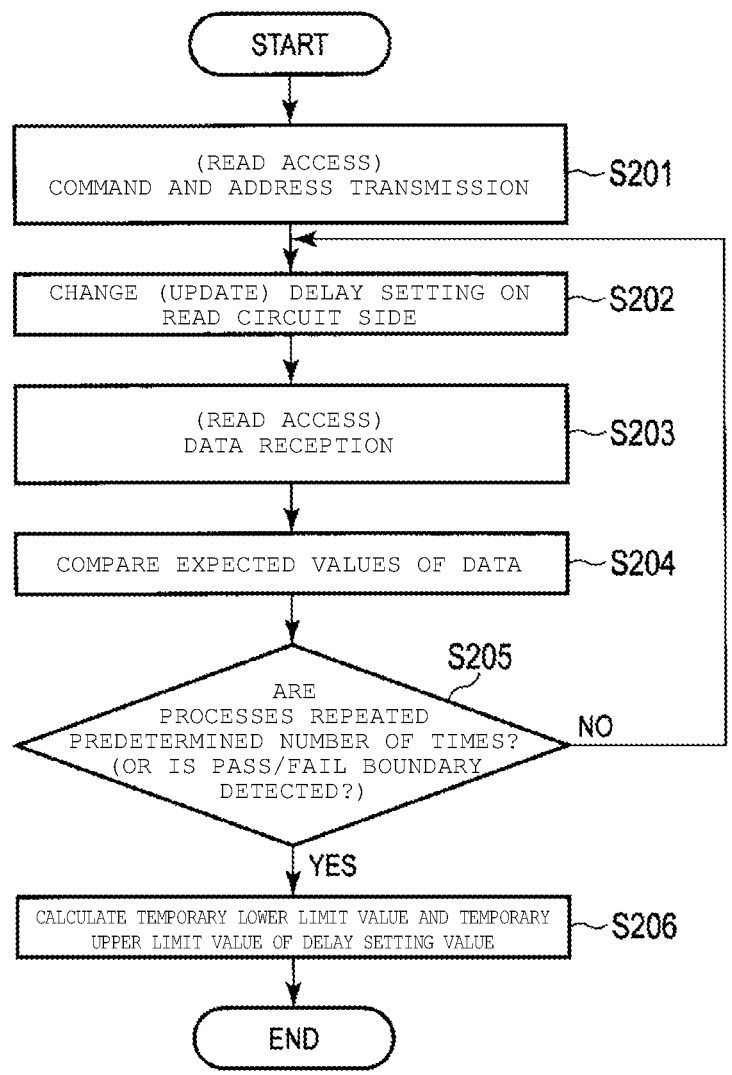
FIG. 7 is a flowchart showing an example of a first search process in the read training process in the embodiment.

FIG. 7 is a flowchart showing an example of a first search process in the read training process according to the embodiment. FIG. 7 is a diagram for describing in detail the process of S104 in FIG. 6.

The first search process is carried out to measure approximate positions (temporary lower limit value and temporary upper limit value) of both a boundary changing from fail to pass and a boundary changing from pass to fail in the pass/fail distribution. More specifically, in the first search process, for example, when the data signal DQ0 is set as a search target, values near both A and B in FIG. 3 are measured.

In S201, the memory access circuit 31 executes command and address transmission (command phase P1) for reading the data written in the NAND device 4 in S103.

In S202, the memory access circuit 31 executes the phase-adjustment phase P2, and changes (updates) the delay setting of the delay adjustment circuit D2 on the memory read circuit R side. The initial value of the delay amount in the first search process is set to 0 [deg].

In S203, the memory access circuit 31 executes the read phase P3 and receives data from the NAND device 4.

In S204, the memory access circuit 31 compares the data received from the NAND device 4 in S203 with the data (expected values) written in the NAND device 4 in S103. When the comparison result matches, the memory access circuit 31 determines that the read process based on the delay setting is passed, and when the comparison result does not match, the memory access circuit 31 determines that the read process based on the delay setting is failed. The memory access circuit 31 generates a pass/fail distribution based on the determination result.

In S205, the memory access circuit 31 determines whether or not the processes in S202 to S204 are repeated a predetermined number of times. When the memory access circuit 31 determines that the number of times of repetition in S202 to S204 is less than the predetermined number of times (NO in S205), the process returns to S202. The predetermined number of times is, for example, 16 times as described above in S104. Meanwhile, when the memory access circuit 31 determines that the number of times of repetition in S202 to S204 is not less than the predetermined number of times (YES in S205), the process proceeds to S206.

In S205, when the memory access circuit 31 determines that the approximate position of the pass/fail boundary (temporary lower limit value or temporary upper limit value) is measured even if the number of times of repetition in S202 to S204 is less than the predetermined number of times, the process may proceed to S206 without returning to S202. Accordingly, it is possible to shorten the time required for the first search process.

In S202, the delay setting of the delay adjustment circuit D2 on the memory read circuit R side is updated. For example, when the adjustment width of the set value is 11.25 [deg], the second set value is 11.25 [deg], and the third set value is 22.5 [deg]. Similarly, the set values after the fourth time increase by 11.25 [deg].

In S206, the memory access circuit 31 calculates a temporary lower limit value (for example, a value near A in FIG. 3) and a temporary upper limit value (for example, a value near B in FIG. 3) of the delay setting value based on the pass/fail distribution generated by the processes until S205. Specifically, the memory access circuit 31 increases the set value from 0 [deg] according to the processes in S201 to S205, and sets the set value that is first passed beyond the boundary of fail to pass to the temporary lower limit value of the delay setting value. Similarly, when the memory access circuit 31 increases the set value from 0 [deg] and the set value crosses the boundary of pass to fail, the memory access circuit 31 sets the set value that is last passed to the temporary upper limit value.

In the first search process described above, the delay amount is updated from 0 [deg] in an increasing direction. Alternatively, the delay amount may be updated from 180 [deg] in a decreasing direction. That is, in S202, the delay amount is initially set to 180 [deg], and the delay setting may be updated with a value decreased from 180 [deg] by the adjustment width (decreasing width in this case). Further, for example, according to the detection of the pass/fail boundary by searching in the increasing direction from 0 [deg], the search direction may be switched and searching in the decreasing direction from 180 [deg] may be performed. Accordingly, the pass/fail boundary can be more efficiently searched.

Figure 8:
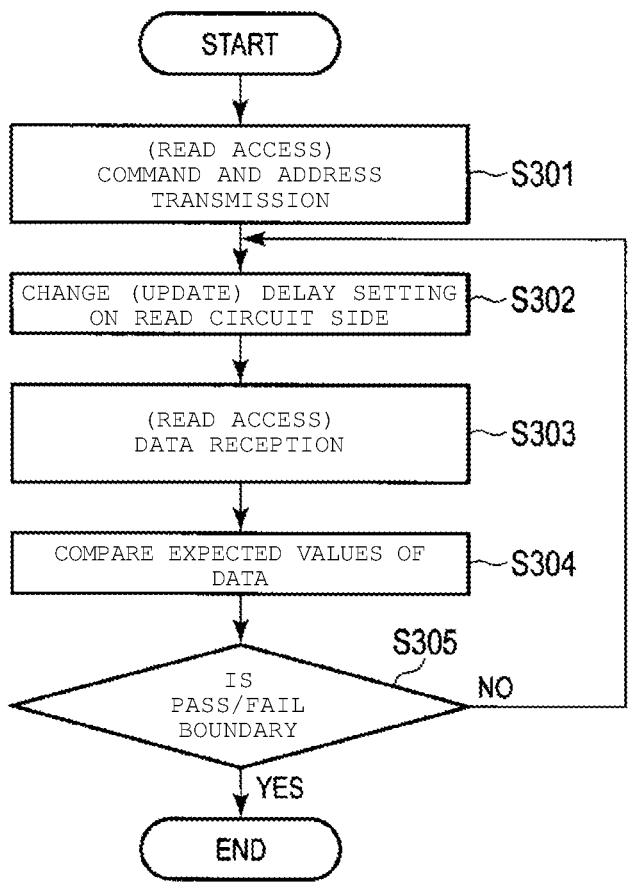
FIG. 8 is a flowchart showing an example of a second search process in the read training process in the embodiment.

FIG. 8 is a flowchart showing an example of a second search process in the read training process according to the embodiment. FIG. 8 is a diagram for describing in detail the processes of S105 and S107 in FIG. 6.

The second search process is a process of calculating a more accurate lower limit value and a more accurate upper limit value based on the temporary lower limit value and the temporary upper limit value of the delay setting value obtained by the first search process.

In S301, the memory access circuit 31 executes command and address transmission (command phase P1) for reading the data written in the NAND device 4.

In S302, the memory access circuit 31 executes the phase-adjustment phase P2, and changes (updates) the delay setting of the delay adjustment circuit D2 on the memory read circuit R side. The initial value of the delay amount in the process of S105 in FIG. 6 is set to a value obtained by subtracting the adjustment width of the set value in the first search process from the temporary lower limit value obtained by the first search process. Thereafter, the lower limit value of the delay setting value is searched while the delay amount is repeatedly updated (added in this case) by a predetermined adjustment width. The initial value of the delay amount in the process of S107 in FIG. 6 is set to a value obtained by adding the adjustment width of the set value in the first search process to the temporary upper limit value obtained by the first search process. Thereafter, the upper limit value of the delay setting value is searched while the delay amount is repeatedly updated (subtracted in this case) by a predetermined adjustment width. In the second search process, the adjustment width of the set value is smaller than that of the first search process.

Since the processes in S303 and S304 are the same as the processes in S203 and S204, the description thereof will be omitted. In S304, the memory access circuit 31 can generate a pass/fail distribution in which the step size of the delay amount is smaller (finer) than the pass/fail distribution generated in S204.

In S305, the memory access circuit 31 determines whether a boundary between pass and fail (pass/fail boundary) in the generated pass/fail distribution is detected. When no pass/fail boundary is detected (NO in S305), the process returns to S302 and the delay setting of the delay adjustment circuit D2 on the memory read circuit R side is updated.

In S302, for example, when the adjustment width of the set value in the second search process is set to ¼ of the adjustment width of the set value in the first search process, the adjustment width is 11.25/4=2.8125 [deg]. Therefore, the second set value of the delay amount in S105 is (the initial value+2.8125) [deg]. In addition, the second set value of the delay amount in S107 is (the initial value−2.8125) [deg]. That is, the second and subsequent set values in S105 are increased by 2.8125 [deg], and the second and subsequent set values in S107 are decreased by 2.8125 [deg].

Meanwhile, in S305, when the pass/fail boundary is detected (YES in S305), the process is ended.

Figure 9:
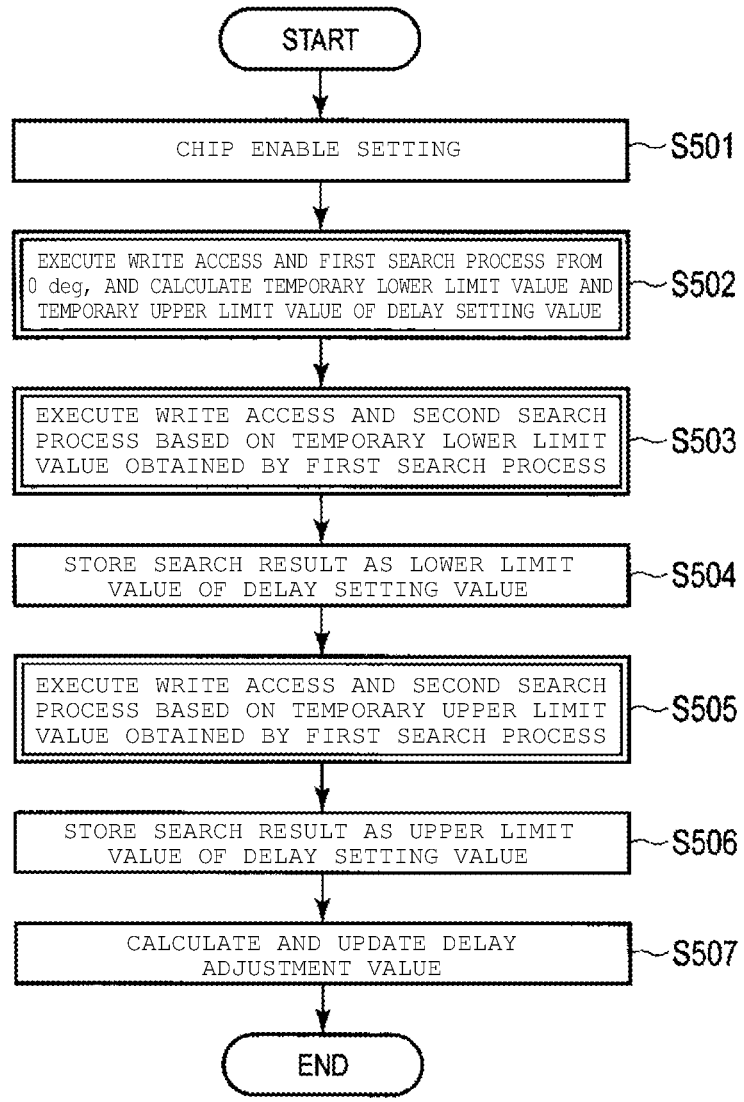
FIG. 9 is a flowchart showing an example of a write training process in the embodiment.

FIG. 9 is a flowchart showing an example of a write training process according to the embodiment.

In S501, the memory access circuit 31 sets the chip enable signal CEB of the NAND device 4 that is the process target to an active state.

In S502, the memory access circuit 31 sets an initial set value of the delay amount of the strobe signal DQS to 0 [deg], and executes a first search process of writing the data consecutively a plurality of times while roughly increasing the set value to 180 [deg] and reading the write data with a predetermined delay setting value. Accordingly, the pass/fail distribution in the write access and the approximate boundary value of pass and fail are calculated.

The adjustment width of the set value in the first search process of the write training may be the same as the adjustment width of the set value in the first search process of the read training.

As a result of the first search process, the memory access circuit 31 calculates the temporary lower limit value and the temporary upper limit value of a delay setting value. Details of the first search process will be described below with reference to FIG. 10. The lower limit value and the upper limit value of the delay setting value in the write training are synonymous with the lower limit value and the upper limit value of the delay setting value in the read training (see S104).

In S503, the memory access circuit 31 sets the initial value of the delay amount of the strobe signal DQS to a value near the temporary lower limit value obtained by the first search process. Then, the memory access circuit 31 executes the second search process of writing the data consecutively a plurality of times while increasing the set value with an adjustment width (increasing width in this case) finer than the adjustment width of the set value in the first search process, and of reading the write data.

In S504, the memory access circuit 31 stores the search result obtained by the second search process based on the temporary lower limit value as a lower limit value of the delay setting value.

In S505, the memory access circuit 31 sets the initial value of the delay amount of the strobe signal DQS to a value near the temporary upper limit value obtained by the first search process. Then, similarly to S503, the memory access circuit 31 executes the second search process of writing the data consecutively a plurality of times while decreasing the set value with an adjustment width (decreasing width in this case) finer than the adjustment width of the set value in the first search process, and of reading the write data.

Details of the second search process based on the temporary lower limit value in S503 and the second search process based on the temporary upper limit value in S505 will be described below with reference to FIG. 11.

In S506, the memory access circuit 31 stores the search result obtained by the second search process based on the temporary upper limit value as an upper limit value of the delay setting value.

In S507, the memory access circuit 31 calculates and updates the delay adjustment value V1 of the delay adjustment circuit D1 on the memory write circuit W side based on the upper limit value and the lower limit value of the delay setting values obtained by S503 and S505. By the above procedure, the write training is completed.

Figure 10:
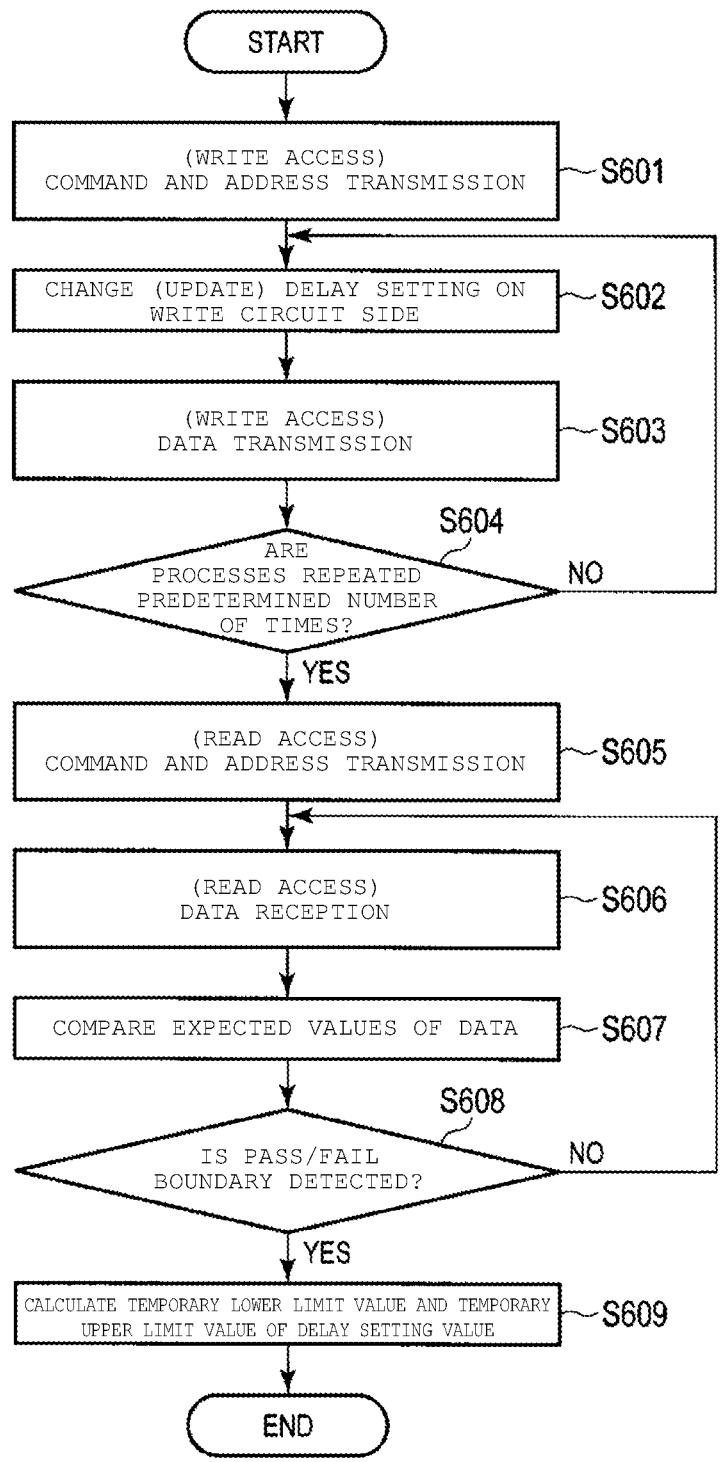
FIG. 10 is a flowchart showing examples of a first write process and a first search process in the write training process in the embodiment.

FIG. 10 is a flowchart showing an example of a first search process in the write training process according to the embodiment. FIG. 10 is a diagram for describing in detail the process of S502 in FIG. 9.

As in the first search process of the read training, the first search process of the write training is intended to measure approximate positions (temporary lower limit value and temporary upper limit value) of both the boundary changing from fail to pass and the boundary changing from pass to fail in the pass/fail distribution.

S601 to S604 are processes of writing data consecutively a plurality of times, and S605 to S608 are processes of reading the write data.

In S601, the memory access circuit 31 executes command and address transmission (command phase P1) for writing the data in the NAND device 4.

In S602, the memory access circuit 31 executes the phase-adjustment phase P2, and changes (updates) the delay setting of the delay adjustment circuit D1 on the memory write circuit W side. The initial value of the delay amount in the first search process is set to 0 [deg].

In S603, the memory access circuit 31 executes the write phase P3 and transmits the data to the NAND device 4.

In S604, the memory access circuit 31 determines whether or not the processes in S602 and S603 are repeated a predetermined number of times. When the memory access circuit 31 determines that the number of times of repetition in S602 and S603 is less than the predetermined number of times (NO in S604), the process returns to S602. The predetermined number of times is, for example, 16 times as in the case of the read training process. Meanwhile, when the memory access circuit 31 determines that the number of times of repetition in S602 and S603 is not less than the predetermined number of times (YES in S604), the process proceeds to S605.

In S602, the delay setting of the delay adjustment circuit D1 on the memory write circuit W side is updated. Since the updating process is the same as S202, the description thereof will be omitted.

In the read processes of S605 to S607, the delay setting value is preferably set to a value that can reliably read the write data. For example, the delay setting value may be set based on the delay adjustment value V2 of the delay adjustment circuit D2 on the memory read circuit R side calculated in the read training.

Since the processes other than the delay setting in the read processes of S605 to S607 are the same as the processes of S201, S203, and S204 in the read training, the description thereof will be omitted.

In S608, the memory access circuit 31 determines whether or not a boundary between pass and fail (pass/fail boundary) in the generated pass/fail distribution is detected. When no pass/fail boundary is detected (NO in S608), the process returns to S606. In S606, the read process is executed again. In the read process executed again, a delay setting value different from the delay setting value used in the read process in the previous S606 may be set. Meanwhile, when the pass/fail boundary is detected (YES in S608), the process proceeds to S609.

In S609, the memory access circuit 31 calculates a temporary lower limit value and a temporary upper limit value of the delay setting value based on the pass/fail distribution generated by the processes until S608.

Specifically, the memory access circuit 31 sets the set value that is first passed beyond the boundary of fail to pass to the temporary lower limit value of the delay setting value. Similarly, when the set value crosses the boundary of pass to fail, the memory access circuit 31 sets the set value that is last passed to the temporary upper limit value.

Figure 11:
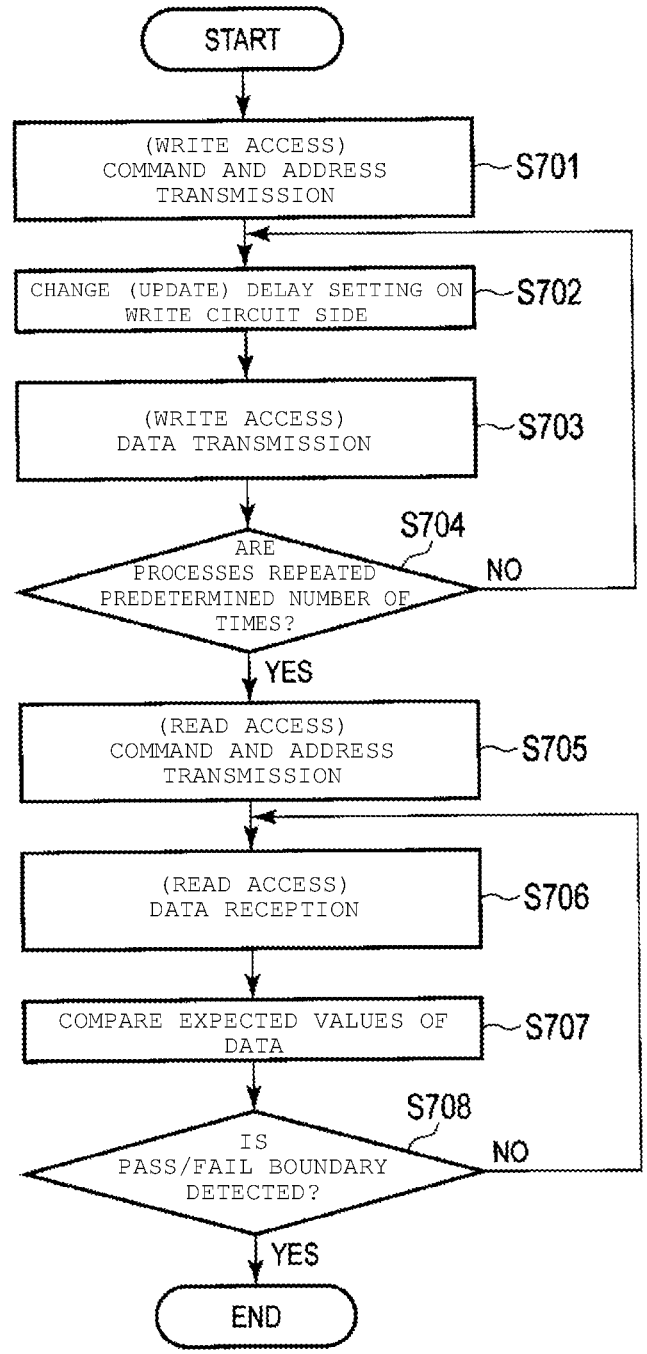
FIG. 11 is a flowchart showing examples of a second write process and a second search process in the write training process in the embodiment.

FIG. 11 is a flowchart showing an example of a second search process in the write training process according to the embodiment. FIG. 11 is a diagram for describing in detail the processes of S503 and S505 in FIG. 9.

Similarly to the read training, the second search process is a process of calculating a more accurate lower limit value and a more accurate upper limit value based on the temporary lower limit value and the temporary upper limit value of the delay setting value obtained by the first search process.

In S701, the memory access circuit 31 executes command and address transmission (command phase P1) for writing the data in the NAND device 4.

In S702, the memory access circuit 31 executes the phase-adjustment phase P2, and changes (updates) the delay setting of the delay adjustment circuit D1 on the memory write circuit W side. The initial value of the delay amount in the process of S503 in FIG. 9 is set to a value obtained by subtracting the adjustment width of the set value in the first search process from the temporary lower limit value obtained by the first search process. Thereafter, the lower limit value of the delay setting value is searched while the delay amount is repeatedly updated (added in this case) by a predetermined adjustment width. The initial value of the delay amount in the process of S505 in FIG. 9 is set to a value obtained by adding the adjustment width of the set value in the first search process to the temporary upper limit value obtained by the first search process. Thereafter, the upper limit value of the delay setting value is searched while the delay amount is repeatedly updated (subtracted in this case) by a predetermined adjustment width. Similarly to the read training, in the second search process, the adjustment width of the set value is smaller than that of the first search process.

Since the processes in S703 and S704 are the same as the processes in S603 and S604, the description thereof will be omitted.

Similarly to the read processes of S605 to S608, the delay setting value in the read processes of S705 to S708 is preferably set to a value that can reliably read the write data. Since the processes other than the delay setting in the read processes of S705 to S708 are the same as the processes of S301, and S303 to S305 in the read training, the description thereof will be omitted. When no pass/fail boundary is detected in S708 (NO in S708), the process returns to S706. In S706, similarly to S606 in FIG. 10, the read process is executed again.

Figure 12:
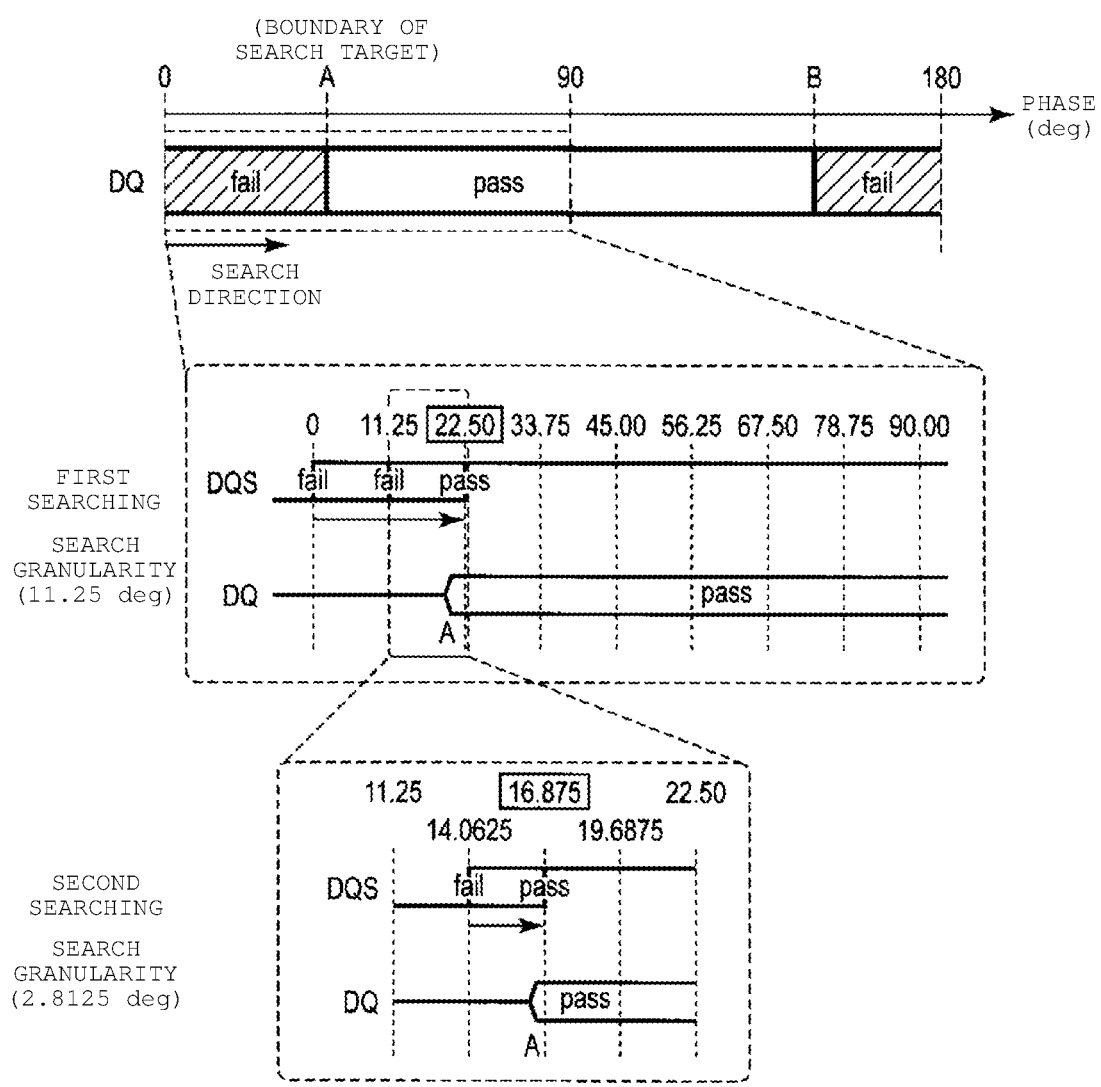
FIG. 12 is a diagram showing a first example of the first search process and the second search process in the embodiment.

FIG. 12 is a diagram showing a first example of the first search process and the second search process according to the embodiment.

In the following description, for example, processes for generating a pass/fail distribution by performing the read training on the data signal DQ (data signal DQ0 in FIG. 3) and calculating A [deg] that is the pass/fail boundary will be described with reference to FIGS. 6 to 8.

First, the memory access circuit 31 executes the first search process (S104).

The memory access circuit 31 starts the command phase P1 (S201), and sets the delay setting value of the strobe signal DQS in the subsequent phase-adjustment phase P2 to 0 [deg] (S202). The memory access circuit 31 executes the read access (S203), and compares the expected values of the data to generate a pass/fail distribution (S204). The adjustment width (search granularity) of the set value is, for example, 11.25 [deg], and the memory access circuit 31 repeats the process 16 times until the set value becomes 180 [deg] (S205).

As a result, since 11.25 [deg] is failed and 22.50 [deg] is passed, the temporary lower limit value of the delay setting value is calculated to be 22.50 [deg] (S206). That is, as a result of the first search process, it is apparent that the pass/fail boundary is present between 11.25 [deg] and 22.50 [deg].

Next, the memory access circuit 31 executes the second search process (S105). The adjustment width (search granularity) of the set value is set to, for example, 2.8125 [deg].

The memory access circuit 31 starts the command phase P1 (S301), and calculates and sets the delay setting value of the strobe signal DQS in the subsequent phase-adjustment phase P2 to be 11.25 [deg] which is the value obtained by subtracting the adjustment width (11.25 [deg]) of the set value in the first search process from the temporary lower limit value (22.50 [deg]) of the delay setting value (S302). The memory access circuit 31 executes the read access in the delay setting value (S303), and compares the expected values of the data to generate a pass/fail distribution (S304).

Further, the memory access circuit 31 increases the delay setting value by the adjustment width (2.8125 [deg]) of the set value in the second search process (S302).

As a result of repetition of the above process while increasing the delay setting value, since 14.0625 [deg] is failed and 16.875 [deg] which is the next delay setting value is passed, the lower limit value of the delay setting value is calculated to be 16.875 [deg] (S106). That is, as a result of the second search process, a more accurate delay setting value than the first search process is calculated.

Also when the write data is read in the write training, the first process and the second process are executed as described above.

Figure 13:
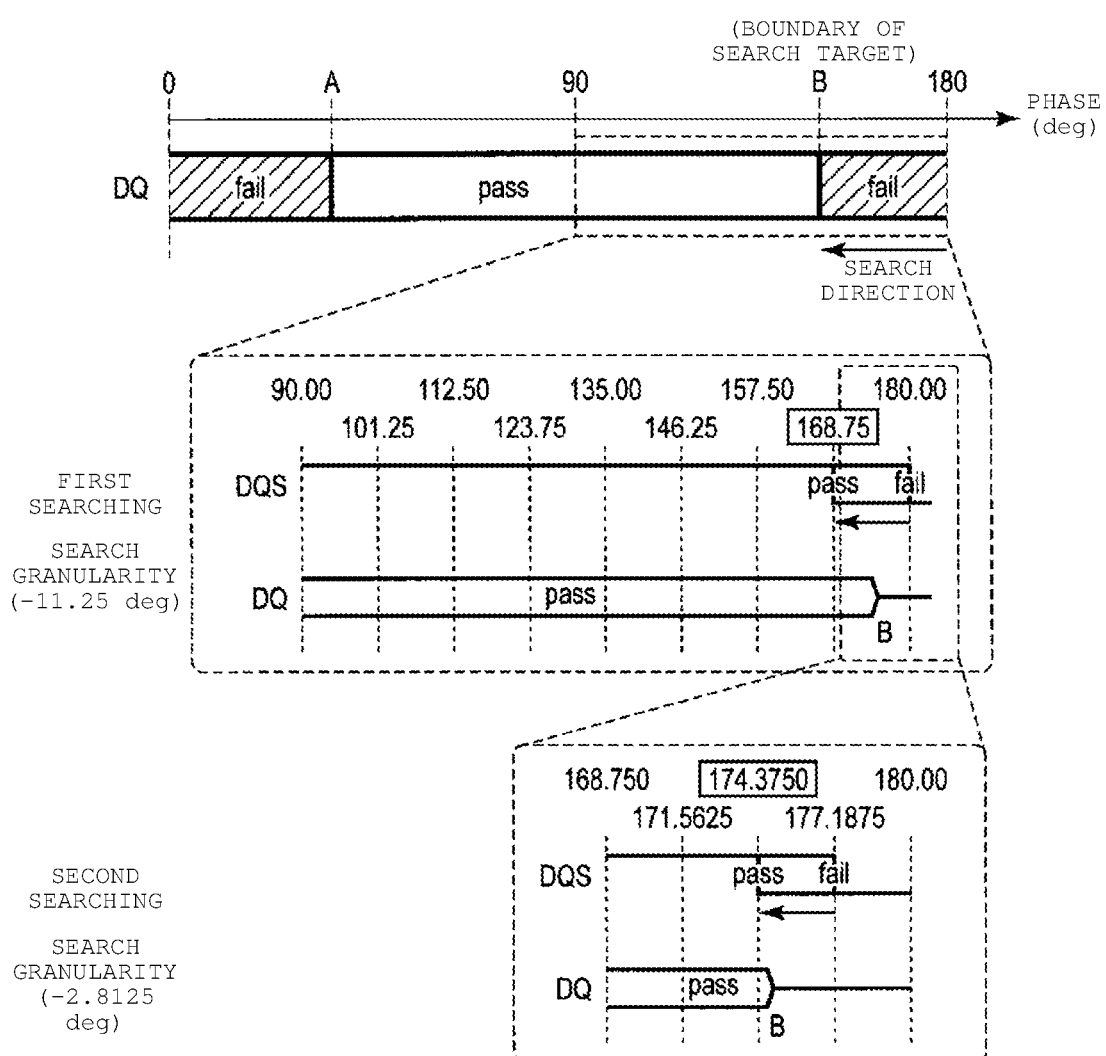
FIG. 13 is a diagram showing a second example of the first search process and the second search process in the embodiment.

FIG. 13 is a diagram showing a second example of the first search process and the second search process according to the embodiment.

In the following description, for example, processes for generating a pass/fail distribution by performing the read training on the data signal DQ (data signal DQ0 in FIG. 3) and calculating B [deg] that is the pass/fail boundary will be described with reference to FIGS. 9 to 11.

First, the memory access circuit 31 executes the first search process (S104). Since the first search process is the same as the example of FIG. 12, the description thereof will be omitted. In FIG. 13, the memory access circuit 31 decreases the set value from 180 [deg] by 11.25 [deg]. However, similarly to FIG. 12, the memory access circuit 31 may calculate the pass/fail boundary by increasing the set value from 0 [deg].

As a result, since 180.00 [deg] is failed and 168.75 [deg] is passed, the temporary upper limit value of the delay setting value is calculated to be 168.75 [deg] (S206). That is, as a result of the first search process, it is apparent that the pass/fail boundary is present between 168.75 [deg] and 180.00 [deg].

Next, the memory access circuit 31 executes the second search process (S107). As in the case of FIG. 12, the adjustment width (search granularity) of the set value in the second search process is set to, for example, 2.8125 [deg].

The memory access circuit 31 starts the command phase P1 (S301), and calculates and sets the delay setting value of the strobe signal DQS in the subsequent phase-adjustment phase P2 to be 180.00 [deg] which is a value obtained by adding the adjustment width (11.25 [deg]) of the set value in the first search process to the temporary upper limit value (168.75 [deg]) of the delay setting value (S302). The memory access circuit 31 executes the read access in the delay setting value (S303), and compares the expected values of the data to generate a pass/fail distribution (S304).

Further, the memory access circuit 31 decreases the delay setting value by the adjustment width (2.8125 [deg]) of the set value in the second search process (S302).

As a result of repetition of the above process while decreasing the delay setting value, since 177.1875 [deg] is failed and 174.375 [deg] which is the next delay setting value is passed, the upper limit value of the delay setting value is calculated to be 174.375 [deg] (S108). That is, as a result of the second search process, a more accurate delay setting value than the first search process is calculated.

Also when the write data is read in the write training, the first process and the second process are executed as described above.

In the above-described embodiment, the memory access circuit 31 repeats a plurality of times consecutively execution of the read (or write) phase P3 while changing setting of the delay amount for one command phase P1 at the time of executing the read training or the write training of the delay adjustment circuit to the NAND device 4. Accordingly, since the time required for the read access or the write access to the NAND device is shortened, training of the delay adjustment circuit can be completed in a short time.

In the embodiment, the memory access circuit 31 stores the data to be read (or written) by the read (or write) phase P3 the plurality of times in a predetermined address of the buffer 41, respectively. Accordingly, it is possible to achieve consecutive reading operations (or writing operations) in one command phase P1 and to effectively use the capacity of the buffer 41.

In the embodiment, in the read training or the write training, the memory access circuit 31 executes the first search process of generating the pass/fail distribution by changing the delay amount of the strobe signal DQS, and then executes the second search process of generating the pass/fail distribution by changing the delay amount of the strobe signal DQS finer than that of the first search process. Accordingly, the pass/fail boundary can be efficiently searched.

In the embodiment described above, the controller 3 adjusts the phase of the strobe signal DQS. The phase of the data signal DQ may also be similarly adjusted. When the phase of the data signal DQ is adjusted, a delay adjustment circuit similar to the delay adjustment circuits D1 and D2 is also provided for the data signal DQ.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device comprising:
   a non-volatile memory including a buffer; and
   a controller configured to transmit a control command to the non-volatile memory, and then to repeat a process including a phase changing process of changing a phase value of a timing signal indicating timing to read data from the non-volatile memory, a read process of reading a portion of data stored in the buffer in the non-volatile memory to the controller in synchronization with the timing signal of the changed phase value, and a determination process of determining whether or not the read process in synchronization with the timing signal of the changed phase value is successful, a certain plurality of times without transmitting any other control command to the non-volatile memory during repetition of the process.

2. The storage device according to claim 1, wherein
   the buffer has a first size, and the portion of the data read during the read process has a second size smaller than the first size, and
   the controller is further configured to determine the certain plurality of times based on a value obtained by dividing the first size with the second size.

3. The storage device according to claim 1, wherein
   the controller is further configured to set an adjustment phase value of the timing signal based on a determination result of whether or not the read process is successful with respect to each of the phase values, and to read data from the non-volatile memory in synchronization with the timing signal of the adjustment phase value.

4. The storage device according to claim 3, wherein
   the controller is further configured to determine whether or not the read process is successful with respect to each of phase values changed by a first adjustment amount, and then to determine whether or not the read process is successful with respect to each of phase values changed by a second adjustment amount smaller than the first adjustment amount.

5. The storage device according to claim 4, wherein the controller is further configured to determine the first adjustment amount based on a value obtained by dividing 180 degree with the certain plurality of times.

6. The storage device according to claim 1, wherein the controller is further configured to transmit a second control command to the non-volatile memory, and then to repeat a second process including a second phase changing process of changing a phase value of a second timing signal indicating timing to write data to the non-volatile memory and a write process of writing data from the controller to the buffer in the non-volatile memory in synchronization with the second timing signal of the changed phase value, a second certain plurality of times without transmitting any other control command to the non-volatile memory during repetition of the second process.

7. The storage device according to claim 6, wherein the data written during the write process has a third size smaller than the first size, and the controller is further configured to determine the second certain plurality of times based on a value obtained by dividing the first size with the third size.

8. The storage device according to claim 6, wherein the controller is further configured to determine whether or not the write process is successful with respect to each of phase values, to set a second adjustment phase value of the second timing signal based on a determination result of whether or not the write process is successful with respect to each of the phase values, and to write data to the non-volatile memory in synchronization with the second timing signal of the second adjustment phase value.

9. The storage device according to claim 8, wherein the controller is further configured to determine whether or not the write process is successful with respect to each of phase values changed by a third adjustment amount, and then to determine whether or not the write process is successful with respect to each of phase values changed by a fourth adjustment amount smaller than the third adjustment amount.

10. The storage device according to claim 9, wherein the controller is further configured to determine the third adjustment amount based on a value obtained by dividing 180 degree with the second certain plurality of times.

11. A storage device comprising:
a non-volatile memory including a buffer; and
a controller configured to transmit a control command to the non-volatile memory, and then to repeat a process including a phase changing process of changing a phase value of a timing signal indicating timing to write data to the non-volatile memory, a write process of writing data from the controller to the buffer in the non-volatile memory in synchronization with the timing signal of the changed phase value, and a determination process of determining whether or not the write process in synchronization with the timing signal of the changed phase value is successful, a certain plurality of times without transmitting any other control command to the non-volatile memory during repetition of the process.

12. The storage device according to claim 11, wherein the buffer has a first size, and the data written during the write process has a second size smaller than the first size, and the controller is further configured to determine the certain plurality of times based on a value obtained by dividing the first size with the second size.

13. The storage device according to claim 11, wherein the controller is further configured to set an adjustment phase value of the timing signal based on a determination result of whether or not the write process is successful with respect to each of the phase values, and to write data to the non-volatile memory in synchronization with the timing signal of the adjustment phase value.

14. The storage device according to claim 13, wherein the controller is further configured to determine whether or not the write process is successful with respect to each of phase values changed by a first adjustment amount, and then to determine whether or not the write process is successful with respect to each of phase values changed by a second adjustment amount smaller than the first adjustment amount.

15. The storage device according to claim 14, wherein the controller is further configured to determine the first adjustment amount based on a value obtained by dividing 180 degree with the certain plurality of times.

16. A method of controlling a non-volatile memory that includes a buffer, comprising:
transmitting a control command to the non-volatile memory; and
after transmitting the control command, repeating a process including a first process of changing a phase value of a timing signal indicating timing to read or write data from or to the non-volatile memory, a second process of reading or writing data from or to the buffer in the non-volatile memory in synchronization with the timing signal of the changed phase value, and a third process of determining whether or not the second process in synchronization with the timing signal of the changed phase value is successful, a certain plurality of times without transmitting any other control command to the non-volatile memory during repetition of the process.

17. The method of claim 16, wherein
the buffer has a first size, and the data read or written during the second process has a second size smaller than the first size,
the method further comprising:
determining the certain plurality of times based on a value obtained by dividing the first size with the second size.

18. The method of claim 16, further comprising:
setting an adjustment phase value of the timing signal based on a determination result of whether or not the second process is successful with respect to each of the phase values; and
accessing the non-volatile memory in synchronization with the timing signal of the adjustment phase value.

19. The method of claim 18, wherein said determining whether or not the second process is successful with respect to each of phase values comprises:
determining whether or not the second process is successful with respect to each of phase values changed by a first adjustment amount; and then
determining whether or not the second process is successful with respect to each of phase values changed by a second adjustment amount smaller than the first adjustment amount.

20. The method of claim 19, further comprising:
determining the first adjustment amount based on a value obtained by dividing 180 degree with the certain plurality of times.

* * * * *